W. S. HENRY.
COUNTER TORQUE EXERTING DEVICE.
APPLICATION FILED JULY 17, 1912.

1,164,517.

Patented Dec. 14, 1915.
3 SHEETS—SHEET 1.

WITNESSES:
George T. Whitney
Sherman A. Benedict

INVENTOR
William S. Henry
BY
Lyman E. Dodge
ATTORNEY

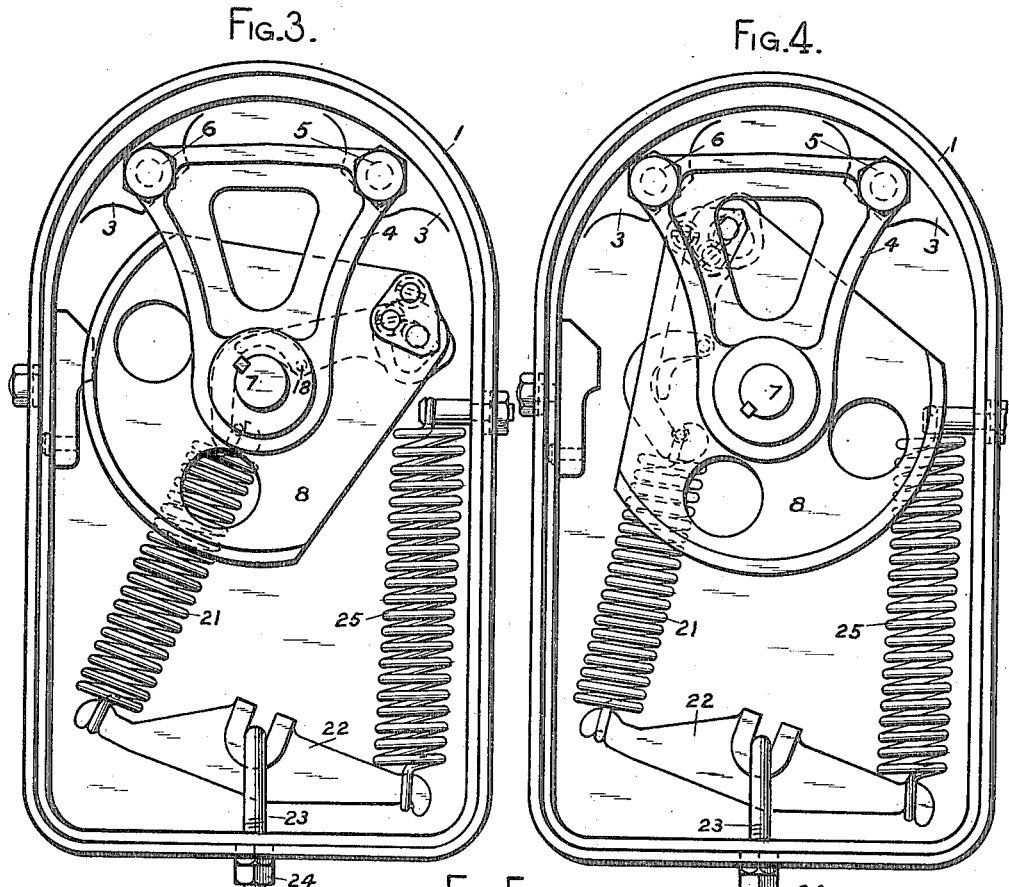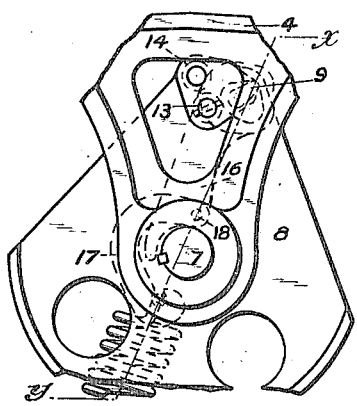

W. S. HENRY.
COUNTER TORQUE EXERTING DEVICE.
APPLICATION FILED JULY 17, 1912.
1,164,517.
Patented Dec. 14, 1915.
3 SHEETS—SHEET 3.
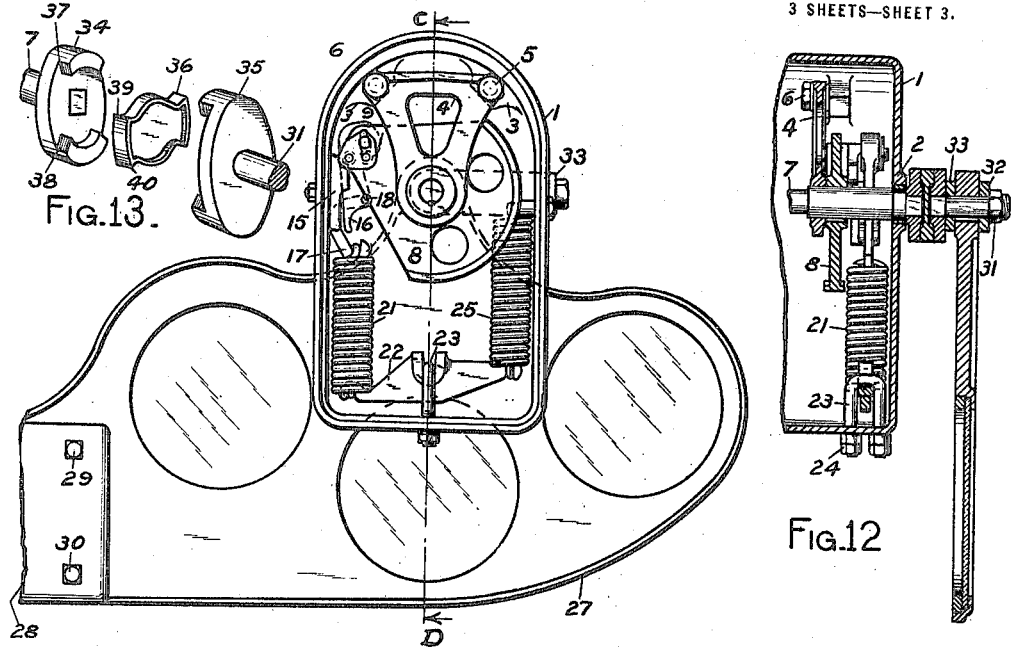
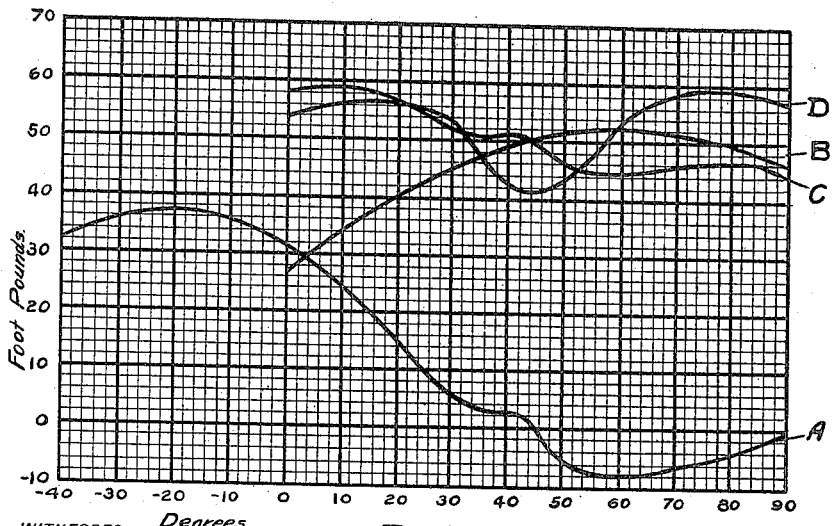
WITNESSES:
George T. Whitney
Sherman A. Benedict
INVENTOR
William S. Henry
BY
Lyman E. Dodge
ATTORNEY

UNITED STATES PATENT OFFICE.

WILLIAM S. HENRY, OF ROCHESTER, NEW YORK, ASSIGNOR TO GENERAL RAILWAY SIGNAL COMPANY, OF GATES, NEW YORK, A CORPORATION OF NEW YORK.

COUNTER-TORQUE-EXERTING DEVICE.

1,164,517.   Specification of Letters Patent.   Patented Dec. 14, 1915.

Application filed July 17, 1912. Serial No. 709,876.

*To all whom it may concern:*

Be it known that I, WILLIAM S. HENRY, a citizen of the United States, and a resident of the city of Rochester, in the county of Monroe and State of New York, have invented a new and useful Counter-Torque-Exerting Device, of which the following is a specification.

This invention relates to a device for producing counter torque and particularly relates to an improvement in the device shown, described and claimed in the patent to Winthrop K. Howe, No. 1,150,005, dated August 10, 1915.

The device shown and described in the patent above mentioned, although used extensively in the practical art to which it relates, is somewhat objectionable as excessive counter torque is exerted by said device during the movement of the device to which it is connected, at times when it is not desired.

The primary object of applicant's invention is to devise an apparatus which will be substantially free from the objection above noted against the prior device.

A further object of the invention is to devise a counter-torque device for shafts or other members mounted for oscillation which will exert a counter-torque at certain points in the movement of said shaft and which will not exert any counter-torque at certain other points in the movement of said shaft.

Other objects and advantages will appear as the description of the invention progresses, and the novel features of the invention will be particularly pointed out in the appended claims.

In describing the invention in detail, reference is had to the accompanying drawing, wherein I have illustrated a preferred physical embodiment of my invention, and wherein like characters of reference designate corresponding parts throughout the several views, and in which—

Figure 1:
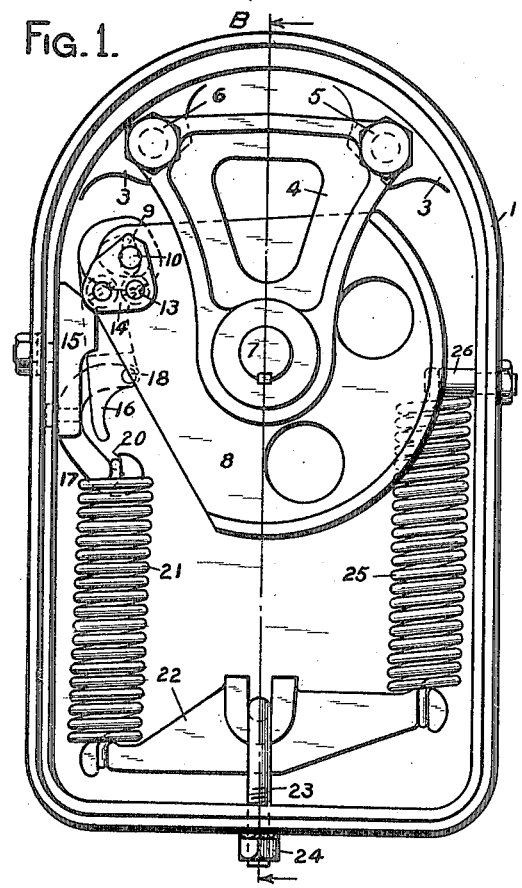
Figure 2:
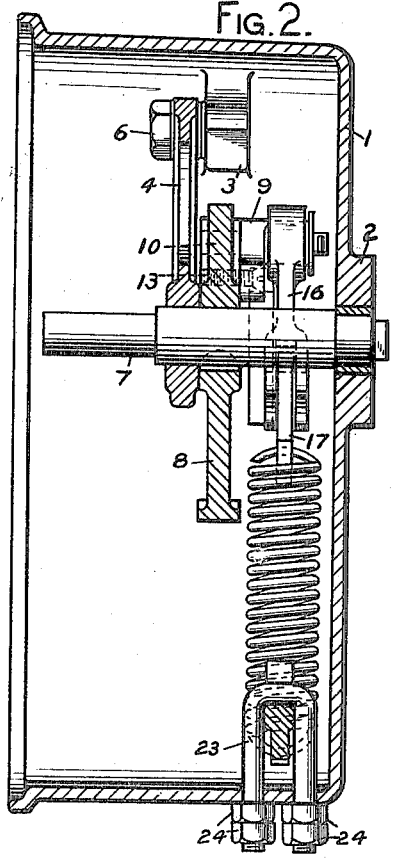
Figure 6:
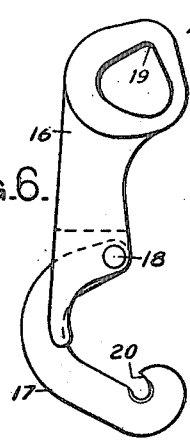
Figure 7:
Figure 8:
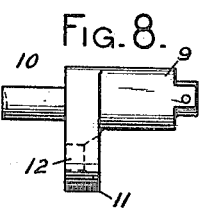
Figure 9:
Figure 10:
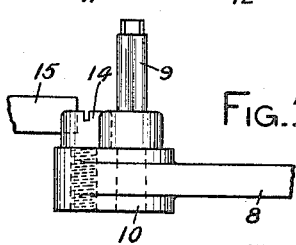

Figure 1 is an elevation of a mechanism embodying the principle of my invention and a casing therefor; Fig. 2, is a cross sectional view of the mechanism shown in Fig. 1, on the line A—B looking in the direction of the arrows; Figs. 3 and 4, show the mechanism of Fig. 1 when moved to different position; Fig. 5, is a fragmentary view showing the main elements of the mechanism in still another position; Figs. 6 and 7 are a front and side view respectively of a two piece link; Figs. 8 and 9 are a side and rear view respectively of a knife edge bearing member; Fig. 10, is a fragmentary top view; Fig. 11, is an elevation showing an application of the invention; Fig. 12, is a cross-sectional view of the mechanism shown in Fig. 11, on the line C—D looking in the direction of the arrows; Fig. 13 is a perspective view of coupling members used by applicant; Fig. 14 is a view showing the results obtained by employing applicant's invention.

1, designates a casing having an enlarged portion 2 forming a bearing, and projecting members 3 to which the hanger 4 is attached by means of the bolts 5 and 6. The hanger 4 and the bearing in projection 2 support the shaft 7 which has keyed thereto the sector 8, so as to move therewith. Any suitable source of power or means for producing motion may be connected to the shaft 7 so as to cause it to rotate and in turn cause the sector 8 to rotate.

The sector 8 bears the knife edge bearing 9, shown in detail in Figs. 8 and 9. The knife edge bearing member 9 has a pin 10 integral therewith which passes through a hole in the sector 8 and is appropriately fastened to the sector. The member 9 also bears a downwardly extending lug 11, through which a hole 12 is formed which is adapted to receive the screw 13, which is threaded into the sector 8 thereby holding the member 9 firmly to the sector. A stop 14 is attached to sector 8, best shown in Fig. 10, which is adapted to contact with the block 15, best shown in Fig. 1, when the sector 8 is in the normal position as shown in Fig. 1.

A link consisting of two members 16 and 17 connected by a pin 18, shown in detail in Figs. 6 and 7 and having a knife edge bearing portion 19, rests upon the knife edge bearing member 9 and is shown in its normal position in Fig. 1. The pin 18 allows members 16 and 17 to move relatively one to the other about the pin 18 as an axis. The member 17 is bowed or offset between its ends, the curvature of this offset being of substantially the same radius as the radius of the shaft 7, so that said offset of said member 17 may fit closely about said shaft in a certain position of said member, as explained fully hereinafter. The other member 16 has a tail projecting beyond the pin 18, which tail, in the normal position of the parts, as shown in Fig. 1, extends part way across the curved or offset portion of the member 17. The member 17 is formed with a hook 20, to which is attached one end of a spring 21, the other end of the spring being connected to a lever 22. The lever 22 is pivoted at its center on the U bolt 23, the ends of which are passed through the bottom of the case 1 and are prevented from being pulled through the bottom of the case by means of the nuts 24, best shown in Fig. 2. The right hand end of the lever 22, as shown in Fig. 1, has one end of the spring 25 connected thereto, the other end of the spring being attached to a fixed pin 26 rigidly attached to the casing 1.

All of the above mentioned mechanism with the exception of the link formed of two members, is shown, described and claimed in the patent to Winthrop K. Howe, heretofore mentioned. In this patent, however, the link member connecting the bearing member 9 with the spring 21 is formed in one piece and consequently does not have the advantages which a link made in two parts has, when constructed according to the principle hereinafter set forth.

In the above mentioned patent, it was pointed out that the object of the mechanism heretofore described, was to store energy during the first portion only of the movement of a movable body and to keep such energy stored during the remainder of the movement of the movable body and to allow such stored energy to rotate the movable body backwardly when the means which are used to rotate the movable body backwardly ceased to exert force. In the present case it is likewise desired to create a source of potential energy during a portion of the movement of the shaft 7 in a clockwise direction.

The device embodying applicant's invention is designed primarily to be used in connection with a railway signal and such use is illustrated in Figs. 11 and 12, wherein 27 designates a fragment of a spectacle frame of a railway signal to which, at the point 28, the ordinary and well-known semaphore blade is connected by means of bolts 29 and 30. The spectacle frame 27 as shown in Fig. 12 is mounted upon a shaft 31, which is carried in bearings 32 and 33 attached to the case 1. Motion is imparted to the shaft 31 by means of the shaft 7 there being a lost motion coupling best shown by Fig. 13, therebetween. The coupling consists of a member 34 attached to shaft 7, a member 35 connected to shaft 31 and a floating member 36 therebetween. The angular distance between the points 37 and 38 upon the member 34, which is constructed exactly as is the member 35, is, in the embodiment shown, 80°, and the angular distance from the point 39 to the point 40 on the member 36, both ends of which are similarly constructed, is 40° so that it must be readily seen that a free movement of 40° is had between members 34 and 35 upon a rotation of shaft 7.

Applicant has illustrated by Figs. 11 and 12 a three position signal which is the ordinary and well-known type at present. A three position signal, when at the danger position would be in the position as shown by Fig. 11. It also has what is known as the 45° or caution position and the 90° or clear position. A railway signal is likely to remain in either the 45° position or the 90° position for some length of time and as it is held in such position by the consumption of energy it is essential that the least energy possible should be used in holding it in such position.

In the previous type of power storing device, to which applicant has referred, an excessive amount of energy was required to hold the signal to which it was connected in the full clear or 90° position as the counter-torque exerted by the power storing device upon the shaft 7 amounted to about eleven foot-pounds, as constructed. By referring to Fig. 14, in which the vertical ordinates represent the torque exerted on shaft 7 in foot pounds and the abscissa represent the angular positions of the shaft 7, it being understood that the 0° to 90° positions of the shaft correspond to the 0° to 90° positions of the semaphore attached to spectacle frame 27, it will be seen by reference to the curve A, which is the curve showing the torque exerted by the springs 21 and 25, on the shaft 7 that when the signal is in the full 90° position, the springs 21 and 25 are exerting absolutely no counter torque on shaft 7, consequently, they have absolutely no tendency to increase the amount of energy needed to hold the signal in the full clear or 90° position. It will also be seen by referring to the same curve that the maximum counter-torque exerted by springs 21 and 25 is at about the middle of the free movement of the shaft 7, that point being designated on the diagram in the table of degrees by −20. It will be therefore seen that when force is applied to the shaft 7 to rotate it in a clockwise direction, the sector 8 will be moved in a clockwise direction together with the link formed of the parts 16 and 17 and that the springs 21 and 25 will be distended so as to gradually increase the torque which is initially about thirty-two foot-pounds for the first 20° of movement and that during the next 20° of movement, that is during the remainder of the free movement, the counter-torque will decrease so as to approach closely its initial value, so that if the force tending to rotate the shaft 7 in a clockwise direction were withdrawn, the springs 21 and 25 would rotate the shaft 7 in a counter clock-wise direction by a force which would gradually increase so as to cause the members to attain speed slowly and would then gradually decrease so as to allow the parts to reach the final portion of their travel with less velocity than they would if the counter-torque were kept at a constant value thereby somewhat lessening the shock to the mechanism. The use to which the counter-clockwise movement of the shaft 7 caused by the springs 21 and 25 is put, is fully explained in the patent to Howe heretofore referred to and is well understood by those skilled in the art of railway signaling.

If the shaft 7 had been rotated in a clockwise direction through the 40° of free movement and then continued in rotation, it would at the limit of the free movement then begin to move the spectacle frame 27 and so move the signal blade connected thereto. In practice it would be moved first to the 45° or caution position and perhaps held in such position. During the movement from the danger position of the blade to the 45° position of the blade a counter-torque would be exerted by the spectacle frame 27 itself which is shown as a curve designated B in Fig. 14, and as is well known, would be a sine curve. The counter-torque exerted upon shaft 7 when the signal blade is in the 45° position is a resultant of the torque exerted by the springs 21 and 25 and the counter-torque exerted by the spectacle frame 27. This resultant counter-torque exerted by both the springs 21 and 25 and the spectacle frame 27 is shown as a curve for all positions of the spectacle frame in Fig. 14 and designated by C. By referring to such curve it will be observed that at the 45° position of the spectacle the returning torque exerted upon the shaft 7 is that exerted by the spectacle frame alone as at the 45° position of the blade the springs 21 and 25, as shown by the curve A, exert no counter-torque. In order to hold the semaphore blade in the 45° position, it will be necessary then only to expend that amount of energy needed to hold the spectacle frame 27, together with its attached blade, in the 45° position, therefore, no different amount of energy would be needed to hold a signal, to which applicant's invention is connected, in the 45° position than would be required to hold any signal of the same form and counter-torque in the same position. By a continued rotation of the shaft 7 in a clockwise direction the spectacle frame 27 will be moved so that the blade is in what is known as the full clear or 90° position at which time, as will be seen by referring to the curve A, the springs 21 and 25 exert no counter-torque upon the shaft 7, consequently, the counter-torque exerted upon the shaft 7 will be that due solely to the counter-torque exerted by the spectacle frame 27 as is shown graphically by the intersection of the curves C and B in the view.

With the old type of link heretofore mentioned the resultant torque curve of the springs 21 and 25 and the spectacle frame 27 would be as shown by the curve D in Fig. 14 and by referring to such curve it will be seen that in the full clear or 90° position of the signal the counter-torque exerted upon the shaft 7 would be approximately eleven foot-pounds more than the counter-torque exerted by the device herein shown when combined with the spectacle frame 27. Due to such increased counter-torque the consumption of energy would be increased and as the majority of signal systems of the country are what is known as the normal clear and the spectacle 27 would be the greater portion of the time in the full clear or 90° position, the cost for energy would be increased.

As batteries are generally used to furnish the electrical energy for moving and holding a semaphore signal in its clear or caution position, an advantage may also be had by the use of applicant's invention even if the consumption of energy is not reduced normally. As an electro-magnet of unchangeable resistance is used to hold a signal in an operated position and as a certain number of ampere turns are needed to sufficiently energize the magnet to cause it to exert sufficient force to hold the semaphore in an operated position, a certain electro-motive force is needed. If a battery is used the electro-motive force supplied will be high at first and then gradually drop to a value at which the electro-magnet will not be sufficiently energized to hold the semaphore in an operated position. If applicant's invention is used, the difference between the original value of the electro-motive force and the minimum value of the electro-motive force below which the electro-magnet will fail to hold the semaphore in an operated position is greater, therefore a much larger variation in the electro-motive force of the battery may be allowed without injuriously affecting the semaphore. This is a great advantage as it obviates the necessity of too frequent charging of the battery and enables a greater amount of energy to be drawn from one charge.

Fig. 1 shows all the parts of applicant's invention in the normal position. Fig. 4 shows the parts just at the moment when the free motion between the parts of the couplings has been taken up. It will be seen that the length of the perpendicular between shaft 7 and the line of action of the spring 21 in moving from the position as shown in Fig. 1, to the position as shown in Fig. 4, is continually decreased and it is a fact that during such movement the greater part of the possible expansion of springs 21 and 25 takes place. During the first part of the free movement the decrease in the lever arm is slight, but the expansion of the springs is great, therefore, the counter-torque increases, during the latter part of the movement, the expansion remains about the same as at the center part of the movement but as the length of the lever arm is decreasing the counter-torque decreases.

In moving toward the 45° position of the blade the parts pass through the position as shown in Fig. 5, which shows the parts about 13° below the 45° position of the blade. It will be observed from this figure that the line of action of the force exerted on knife edge bearing 9 by the spring 21 passes just to the left of the center of shaft 7, as shown by the line X—Y Fig. 5, so that considerable movement of the shaft 7 and, consequently, of the knife edge bearing 9, may be had without greatly changing the value of the counter-torque and it will also be observed that as soon as the line of action of the force exerted by the spring 21 passes to the right of the center of the shaft 7, the torque exerted by the spring 21 is an assisting torque and not a counter-torque, which is shown graphically in Fig. 14 by the passing of the curve line below the zero value of torque. Further movement beyond the position of parts shown in Fig. 5 causes the tail of the member 16 to contact with the shaft 7 and form a fulcrum point for the member 16 which then acts as a lever. As the sector 8 turns farther, the perpendicular distance between the center of the shaft 7 and the line of action of the springs 21 and 25 on the member 16 increases; but the fulcrum point of the tail of the member 16 also shifts; and it is a fact, which can be determined from a careful analysis of the different positions of the parts shown in the drawing, that the resultant torque exerted by the member 16 on the sector 8 first increases and then decreases, as indicated by the torque curve A in Fig. 11. Further rotation of the parts causes the member 16 to move into the position as shown in Fig. 3, which exhibits the parts in the positions in which they would be when the spectacle frame 27 and the blade attached thereto is in the full clear or 90° position. In this position of the parts, the curved or offset portion of the member 17 fits closely around the shaft 7 so that all of the pull of the springs 21 and 25 is borne by said shaft and the counter-torque exerted by the springs 21 and 25 on the shaft 7 is zero, as clearly shown in the torque curve A in Fig. 11.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In a counter-torque exerting device, in combination: a shaft mounted for oscillation; a lever arm attached to said shaft; a link composed of two members united by a pivot pin, one of said members being pivotally connected at its free end to said lever arm, the other of said members having an offset portion near its point of attachment to said first-mentioned member; a spring having one end attached to the free end of said other member; and means for anchoring the other end of said spring, the point of attachment of said first-mentioned member and said lever arm moving from one side to the other of a line extended from the anchored end of said spring through the center of said shaft during the oscillation of said shaft, said shaft being located in the path of movement of said offset portion of said other member.

2. In a counter-torque exerting device, in combination: a shaft mounted for oscillation; an arm fixed to said shaft; a link composed of two members pivotally connected together near their ends, one of said members being pivotally connected at its free end to said arm; a tension spring secured at one end to the free end of said other member; means for anchoring the other end of said spring, the line of action of said spring shifting from one side to the other of the axis of said shaft during the oscillation thereof; and means for holding one of said members against movement in the direction of pull of said spring during part of the oscillation of said shaft.

3. In a counter-torque exerting device, in combination: a shaft adapted to be oscillated in one direction from a normal position; an arm attached to said shaft so as to always oscillate therewith; a link bearing at all times on said arm; and resilient means for resisting movement of said link attached to said link; said link being formed in two parts pivotally connected together; said shaft being arranged in the path of movement of said link whereby a predetermined movement of said shaft causes said link to contact said shaft and one part of the link to pivot upon the other part, the line of action of said means on said arm shifting from one side to the other of said shaft during the oscillation thereof.

4. In a counter-torque exerting device, in combination: a shaft adapted to be oscillated in one direction from a normal position to two operated positions; an arm fixed to said shaft so as to oscillate therewith; a bearing fixed to said arm; a link formed of an upper and a lower member pivotally fastened together, said upper member bearing on said bearing fixed to said arm, and having a projection adapted to contact said shaft after a certain movement of said arm, said lower member formed with a hook and formed with curved portion, said curved portion adapted to fit partly around said shaft after a certain movement of said arm; a helical spring having two ends, one of said ends attached to said hook; a centrally pivoted lever having two ends, one of said ends attached to the other end of said spring; a second helical spring having two ends, one of said ends attached to the other end of said lever; a fixed object having the other end of said second spring attached thereto; all so arranged that no counter torque is exerted upon said shaft when in the said two operated positions.

5. In a counter-torque exerting device, in combination: an oscillatable member; means for oscillating said member in one direction; means including a two part link to exert a counter-torque upon said oscillatable member during a predetermined period of its oscillation and thereby tend to oscillate it in the other direction; and means to reduce said counter-torque at least to zero value during the remainder of the oscillation of said member in the first mentioned direction.

6. In a counter-torque exerting device, in combination: an arm mounted for oscillation; a flexible link connected at one end to said arm; an elastic member connected at one end to the other end of said flexible link; and a fixed anchor for the other end of said elastic member disposed on the side of the axis of oscillation of said arm opposite to the space swept by said arm during the oscillation thereof, the line of action of said elastic member on said arm shifting from one side to the other of its axis of oscillation during the oscillation thereof, and at one point in its oscillation being in a line intersecting its axis of oscillation, whereby at one time during the oscillation of said arm said elastic member exerts no torque thereon.

7. In a counter-torque exerting device, in combination: an arm mounted on an axis for oscillation; a flexible link pivotally connected at one end to said arm; an elastic member connected at one end to the other end of said flexible link; an anchor for the other end of said elastic member, the line of action of said elastic member shifting from one side to the other of the axis of said arm during the oscillation thereof and at one point in the arc of oscillation of said arm being in a line intersecting its axis; and means for reducing the torque exerted by said elastic member on said arm to zero near one extreme of its oscillation.

8. In a counter-torque exerting device, in combination: a shaft mounted for oscillation; an arm fixed to said shaft; a link comprising pivotally connected parts and pivotally connected at one end to said arm; a tension spring connected at one end to the other end of said flexible link; an anchor for the other end of said spring; one part of said link having a curved portion arranged and adapted to hook over said shaft at one point in the oscillation thereof, whereby there is no torque exerted by said spring at that time; the line of action of said spring on said arm shifting from one side to the other of the axis of said shaft during the oscillation thereof, and at another point in the oscillation of said shaft being in a line intersecting the axis thereof, whereby at this last-mentioned point in the oscillation of said shaft no torque is exerted on said arm by said spring.

9. In a counter-torque exerting device, in combination: an arm mounted on an axis for oscillation; a link composed of two members pivotally connected together near their ends, one end of said link being pivotally connected to said arm; means connected to the other end of said link for exerting a pull thereon, the line of action of said means shifting from one side to the other of the axis of said arm as said arm oscillates; and a fixed stop, one member of said link being shaped to engage said stop and to be held against movement thereby in the direction in which said means exerts its pull, said stop being located in position to be engaged by said last-mentioned member near one extreme of the oscillation of said arm.

10. In a counter-torque exerting device, in combination: an arm mounted on an axis for oscillation; a link composed of two members pivotally connected together near their ends, one of said members being pivotally connected at its free end to said arm and having a tail projecting beyond the point of said pivotal connection, the other of said members having a curved offset between its ends; means connected to the free end of said other member for exerting a pull on said link, the line of action of said means shifting from one side to the other of the axis of said arm as said arm oscillates; and a fixed stop arranged in the path of movement of said members and adapted to fit closely in said offset of said other member, said stop being located in position to engage said tail of said first member during the intermediate portion of the oscillation of said arm and to engage said offset of said other member near one extreme of the oscillation of said arm.

11. In a counter-torque exerting device, in combination: an arm mounted on an axis for oscillation: a lever pivotally connected at one end to said arm; a link connected to said lever between its ends and having an offset portion between its ends; means for exerting a pull on said link, the line of action of said means shifting from one side to the other of the axis of said arm during its oscillation; and a fixed stop, said stop being disposed in position to strike the other end of said lever during the intermediate portion of the oscillation of said arm and subsequently to engage said offset portion of said link and hold said link against movement in the direction of the pull exerted by said means.

12. In a signal operating mechanism, in combination: a shaft mounted for oscillation; a semaphore; means for connecting said semaphore and said shaft during a portion of the oscillation of said shaft; means including a spring and a flexible link for exerting a counter-torque on said shaft during a predetermined part of its oscillation, said means at one point in the oscillation of said shaft exerting its pull in a line intersecting the axis of said shaft; and means associated with said link for engaging said shaft near one extreme of the oscillation thereof and for holding said link against movement in the direction of the pull exerted by said spring.

13. In a signal operating mechanism, in combination: a shaft mounted for oscillation; a semaphore; means for connecting said semaphore to said shaft during a portion of the oscillation of said shaft; an arm fixed to said shaft; a link comprising two pivotally connected parts having overlapping ends, said link being connected at one end to said arm; a spring connected at one end to the other end of said link; means for anchoring the other end of said spring, the point of connection between said arm and said link shifting during the oscillation of said shaft from one side to the other of the line extended from the anchored end of said spring through the axis of said shaft, said shaft being arranged in the path of movement of said link and being positioned to engage said link adjacent to the overlapped ends of the parts of said link.

WILLIAM S. HENRY.

Witnesses:
  LILLIAN L. PHILLIPS,
  LILLIAM M. MUTSCHLER.

Copies of this patent may be obtained for five cents each, by addressing the "Commissioner of Patents Washington, D. C."